(12) United States Patent
Lee et al.

(10) Patent No.: US 8,358,707 B2
(45) Date of Patent: Jan. 22, 2013

(54) APPARATUS AND METHOD FOR ULTRA WIDE BAND COMMUNICATION BASED ON MULTI-CODED BI-ORTHOGONAL PULSE POSITION MODULATION

(75) Inventors: Hyung-Soo Lee, Daejeon (KR); Cheolhyo Lee, Daegu (KR); Dong-Jo Park, Daejeon (KR); Sung-Yoon Jung, Seoul (KR); Mi-Kyung Oh, Gyeongsangbuk-do (KR); Dan-Keun Sung, Daejeon (KR); Ki-Ho Kil, Daejeon (KR); Chang-Yong Jung, Chungcheongbuk-do (KR); Jo-Woon Chong, Seoul (KR); Min-Jeong Kim, Daegu (KR); Young-Jun Hong, Seoul (KR); Bang-Chul Jung, Seoul (KR); Min-Sheo Choi, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1418 days.

(21) Appl. No.: 11/718,290

(22) PCT Filed: Mar. 12, 2005

(86) PCT No.: PCT/KR2005/000712
§ 371 (c)(1),
(2), (4) Date: Apr. 30, 2007

(87) PCT Pub. No.: WO2006/049373
PCT Pub. Date: May 11, 2006

(65) Prior Publication Data
US 2009/0016309 A1    Jan. 15, 2009

(30) Foreign Application Priority Data
Nov. 2, 2004  (KR) .......................... 10-2004-0088459

(51) Int. Cl.
*H04B 14/04* (2006.01)
(52) U.S. Cl. ...................................... 375/242; 370/342

(58) Field of Classification Search .................. None
See application file for complete search history.

(56) References Cited

U.S. PATENT DOCUMENTS
5,677,927 A    10/1997  Fullerton et al.
(Continued)

OTHER PUBLICATIONS

Kim, D.I., "Combined Binary Pulse Position Modulation/Biorthogonal Modulation for Direct-Sequence Code Division Multiple Access." Jan. 1999. *IEEE Transactions on Communications*, vol. 47, No. 1, pp. 22-26.

Somayazulu, V.S., "Multiple Access Performance in UWB Systems using Time Hopping vs. Direct Sequence Spreading." 2002. *IEEE* (0-7803-7376-6/02), pp. 522-525.

Clabaugh, D.J., et al., "UWB Multiple Access Performance Using Time Hopped Pulse Position Modulation with Biorthogonal Signaling." 2003. *IEEE* (0-7803-8187-4/03), pp. 330-333.

(Continued)

*Primary Examiner* — Leon-Viet Nguyen
(74) *Attorney, Agent, or Firm* — Ladas & Parry LLP

(57) ABSTRACT

Provided is a communication system for ultra wide band impulse communication, and more particularly, to a communication apparatus and method that can be used in a sensor network or a low-rate wireless personal area network. To be more specific, the present research suggests a transmitter employing multi-coded bi-orthogonal pulse position modulation/demodulation and a method thereof. The transmitter of the present research provides: a serial-to-parallel converter for convening L-bit serial data to be transmitted into parallel data by performing grouping on the L-bit serial data; a multi-coder for generating a multi-coded symbol by multiplying the parallel data by total L orthogonal codes of length $N_s$; a bi-orthogonal pulse position modulator for positioning the multi-coded symbol in a predetermined pulse period and performing biorthogonal pulse position modulation; and a pulse generator for multiplying an output signal of the bi-orthogonal pulse position modulator by a predetermined pulse and outputting an output signal.

10 Claims, 5 Drawing Sheets

U.S. PATENT DOCUMENTS

| | | | | |
|---|---|---|---|---|
| 5,966,377 | A * | 10/1999 | Murai | 370/342 |
| 6,320,897 | B1 | 11/2001 | Fattouche et al. | |
| 7,280,468 | B2 * | 10/2007 | Kang et al. | 370/208 |
| 2003/0076912 | A1 * | 4/2003 | Linksy et al. | 375/376 |
| 2004/0218683 | A1 * | 11/2004 | Batra et al. | 375/261 |
| 2004/0222865 | A1 * | 11/2004 | Romano et al. | 332/106 |

OTHER PUBLICATIONS

Hyung Soo Lee, et al; "Multi-coded Bi-orthogonal PPM (MC-BPPM) based Impulse Radio Technology," IEEE Interim Meeting, Sep. 12-14, 2004; 15 pages.

* cited by examiner

| (L,Ns) | EbNo (dB) | 0 | 2 | 4 | 6 | 8 | 10 | Avg. |
|---|---|---|---|---|---|---|---|---|
| (1,4) | BPPM | 0.995 | 0.998 | 1.005 | 1.003 | 1.000 | 1.000 | 1.000 |
| | BPSK | 1.001 | 1.000 | 1.001 | 0.999 | 1.000 | 1.000 | 1.000 |
| (3,4) | BPPM | 0.604 | 0.606 | 0.587 | 0.554 | 0.521 | 0.505 | 0.563 |
| | BPSK | 0.760 | 0.769 | 0.755 | 0.723 | 0.691 | 0.672 | 0.728 |
| (1,8) | BPPM | 1.003 | 1.005 | 1.003 | 0.999 | 0.999 | 1.000 | 1.002 |
| | BPSK | 1.001 | 0.999 | 0.999 | 0.999 | 0.999 | 1.000 | 1.000 |
| (3,8) | BPPM | 0.580 | 0.584 | 0.573 | 0.548 | 0.520 | 0.505 | 0.552 |
| | BPSK | 0.766 | 0.768 | 0.752 | 0.722 | 0.691 | 0.672 | 0.728 |
| (5,8) | BPPM | 0.211 | 0.222 | 0.225 | 0.214 | 0.199 | 0.190 | 0.210 |
| | BPSK | 0.742 | 0.745 | 0.722 | 0.677 | 0.633 | 0.609 | 0.688 |

APPARATUS AND METHOD FOR ULTRA WIDE BAND COMMUNICATION BASED ON MULTI-CODED BI-ORTHOGONAL PULSE POSITION MODULATION

TECHNICAL FIELD

The present invention relates to an ultra wide band communication system; and more particularly, to a communication apparatus and method that can be used in a sensor network or a low-rate wireless Personal Area Network, and a method thereof.

BACKGROUND ART

Conventional modulation and demodulation methods for ultra wide band impulse communication are as follows:

Pulse Position Modulation/Bi-orthogonal Pulse Position Modulation (PPM/BPPM)

Pulse Amplitude Modulation (PAM) including On-Off Keying method

Phase Shift Keying (PSK) including Binary Phase Shift Keying (BPSK) and Quadrature Phase Shift Keying (QPSK)

Direct Sequence Code (DSC)

First, the PPM/BPPM, a method used and studied for a long time, changes the position of a basic pulse according to 0 or 1. According to the PPM/BPPM where modulation is performed through temporal offset, a signal arriving earlier than a reference time can be determined as '0' and a signal after the arrival of the signal 0 is determined as '1.' A method using an M-ary orthogonal signal can be applied to the PPM ultra wide band modulation/demodulation method to improve a transmission rate and a signal-to-noise ratio. The BPPM method uses one-digit binary data for pulse phase modulation when the M-ary method is used. In case where a binary data signal is transmitted, the BPPM method becomes the same as the BPSK modulation method. As it can be seen from the above description, it is possible to transmit data twice as much as the conventional PPM and to extend a time period occupied by one pulse because a binary datum is transmitted on a phase basis.

Secondly, the PAM method displays information by changing an output. In 8-ary PAM, three-digit binary data are transmitted by using amplitudes in 8 steps. A special form of the PAM is the OOK method in which '1' is transmitted when there is a pulse and '0' when there is no pulse. The BPSK method displays '0' and '1' according to the phase of a signal. The BPSK is advantages over the PPM in the signal-to-noise ratio by 3 dB; in a transmission capacity by two-folds; and in the time period occupied by a pulse by two-folds. However, in the presence of multipath, there is a problem that the phase is changed. The QPSK is a form extended from the BPSK. Whereas the BPSK identifies a signal with '0' or '1,' the QPSK identifies a signal with two-digit binary data, e.g., '00,' '01,' '10' and '11.' Since the QPSK method transmits two-digit binary data with one waveform, it can transmit data twice as much as the BPSK can.

The DSC method which adopts the Direct Sequence-Code Division Multiple Access (DS-CDMA) without any change has advantages that it can prevent the generation of noise excellently and data from being intercepted in the course.

However, the above-described conventional modulation technologies for realizing ultra wide band impulse communication has shortcoming that they can hardly applied to multipath channels and that they have a limitation in data transmission rates.

DISCLOSURE

Technical Problem

It is, therefore, an object of the present invention, which is devised to resolve the problems of the conventional technologies, to provide a communication apparatus and method that can be applied to multipath channels and provide excellent data transmission rates.

It is another object of the present invention to provide a communication apparatus and method whose performance is improved by enhancing error correction ability for correcting errors caused by encoding in a transmitter and a receiver of a communication system.

It is another object of the present invention to provide a communication apparatus and method that can extend a time period used to transmit a pulse by improving link capacity higher than that of conventional technologies, when the same data are to be transmitted in the same time period.

Technical Solution

In accordance with one aspect of the present invention, there is provided a transmitter employing multi-coded bi-orthogonal pulse position modulation in an ultra wide band impulse communication apparatus, which includes: a serial-to-parallel converter for converting L-bit serial data to be transmitted into parallel data by performing grouping on the L-bit serial data; a multi-coder for generating a multi-coded symbol by multiplying the parallel data by total L orthogonal codes of length $N_s$; a bi-orthogonal pulse position modulator for positioning the multi-coded symbol in a predetermined pulse period and performing bi-orthogonal pulse position modulation; and a pulse generator for multiplying an output signal of the bi-orthogonal pulse position modulator by a predetermined pulse and outputting an output signal.

In accordance with one aspect of the present invention, there is provided a modulation method of an ultra wide band impulse communication apparatus, which includes the steps of: a) converting L-bit serial data to be transmitted into parallel data by performing grouping on the L-bit serial data; b) generating a multi-coded symbol by multiplying the parallel data by total L orthogonal codes of length $N_s$; and c) performing bi-orthogonal pulse position modulation based on symmetrical characteristics of elements of the multi-coded symbol to thereby produce a bi-orthogonal pulse position-modulated signal.

The present invention relates to a communication system that performs ultra wide band impulse communication, for example, it provides a communication apparatus and method that can be used in a sensor network or a low-rate wireless Personal Area Network. Particularly, the present invention provides a multi-coded bi-orthogonal pulse position modulation/demodulation method in a communication system performing ultra wide band impulse communication, and a communication apparatus and method employing the same.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. When it is considered that detailed description on prior art may blur the points of the present invention, the description will not be provided herein. Hereinafter, preferred embodiments of the present invention will be described in detail.

To resolve the problems of conventional technologies, the present invention supports coding gain acquisition and diverse transmission rates based on multi-coded bi-orthogonal pulse position modulation and, at the same time, extends a time period occupied by a transmitting pulse. With the technology suggested the present invention, inter-pulse interference caused in an indoor environment due to multipath is reduced, and performance degradation caused in a receiver by interference between pulses can be prevented.

Hereinafter, the technology of the present invention will be described in detail with reference to the accompanying drawings.

A. Multi-Coded Bi-Orthogonal Pulse Position Modulation

Figure 1:
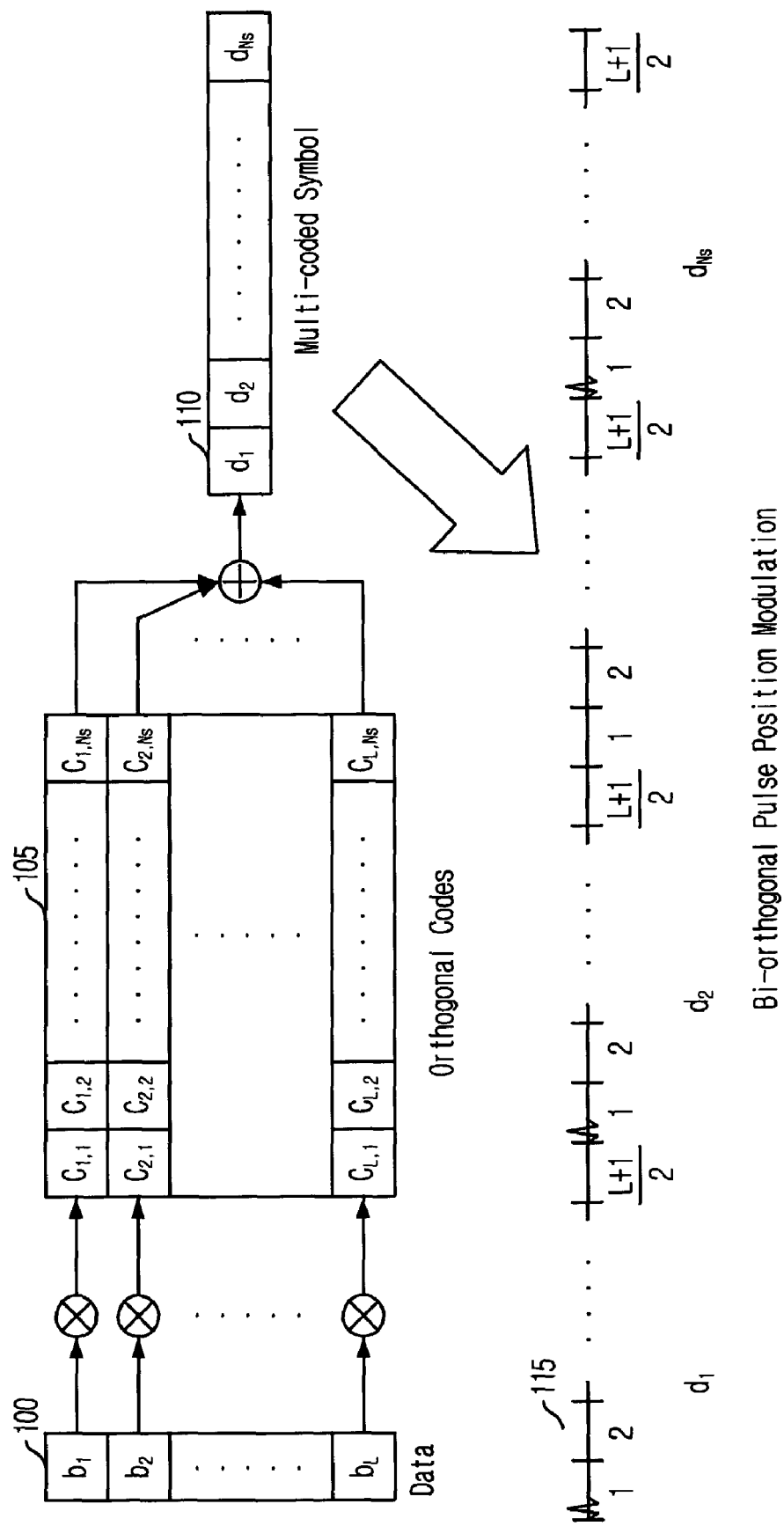
FIG. 1 is a diagram describing a multi-coded bi-orthogonal pulse position modulation method in accordance with an embodiment of the present invention.

FIG. 1 is a diagram describing a multi-coded bi-orthogonal pulse position modulation method in accordance with an embodiment of the present invention. Parameters which will be described hereinafter are as follows.

$T_m$: Time period of a pulse

L: The number of bits of data to be transmitted in each data block $T_c$: Time period of a multi-coded chip $N_s$: Length of a orthogonal multi-code $T_s$: Time period of a multi-coded symbol Referring to FIG. 1, the multi-coded bi-orthogonal pulse position modulation method will be described. First, L-bit binary data 100 to be transmitted in the transmitter are multiplied by total L orthogonal codes 105 having a length of $N_s$ to thereby generate an $N_s$-long multi-coded symbol 110 with a code rate of $L/N_s$, where L is an odd number.

In short, the multi-coded symbols are as follows:

$d_1 = b_1 c_{1,1} + b_2 c_{2,1} \ldots + b_L c_{L,1}$ $d_{Ns} = b_1 c_{1,Ns} + b_2 c_{2,Ns} \ldots + b_L c_{L,Ns}$ Herein, each element of a multi-coded symbol 110 has a value in the range of $-L, -L+2, \ldots, -1, \ldots, +1, L-2, L$.

Subsequently, the multi-coded symbols 110 are modulated by the bi-orthogonal pulse position modulation 115 and multi-coded bi-orthogonal pulse position-modulated signals are transmitted.

Since the elements of the multi-coded symbol have symmetrical characteristics, the bi-orthogonal pulse position modulation is performed based on the symmetrical characteristics. Herein, $(L+1)/2$ pulse position periods are needed to perform bi-orthogonal pulse position modulation on the values of the elements in the multi-coded symbol 110. When the value of an element is $-L$, the pulse is positioned in the first pulse position period. Likewise, when the value of an element is $-L+2$, the pulse is positioned in the second pulse position period and $-L+4$, in the third pulse position period; and L, in the $(L+1)/2\_$th pulse position period. As shown above, the multi-coded symbol 110 having a length of $N_s$ is modulated and transmitted in the bi-orthogonal pulse position modulation 115.

Although the present invention takes an embodiment where the L value is an odd number, it can be applied to a case when the L value is an even number. If any, when the L value is an even number, a total of $(L/2)+1$ pulse position periods are needed and, when the value of an element is 0, the sign of the pulse can be ignored.

B. Physical Layer Frame Structure

Figure 2:
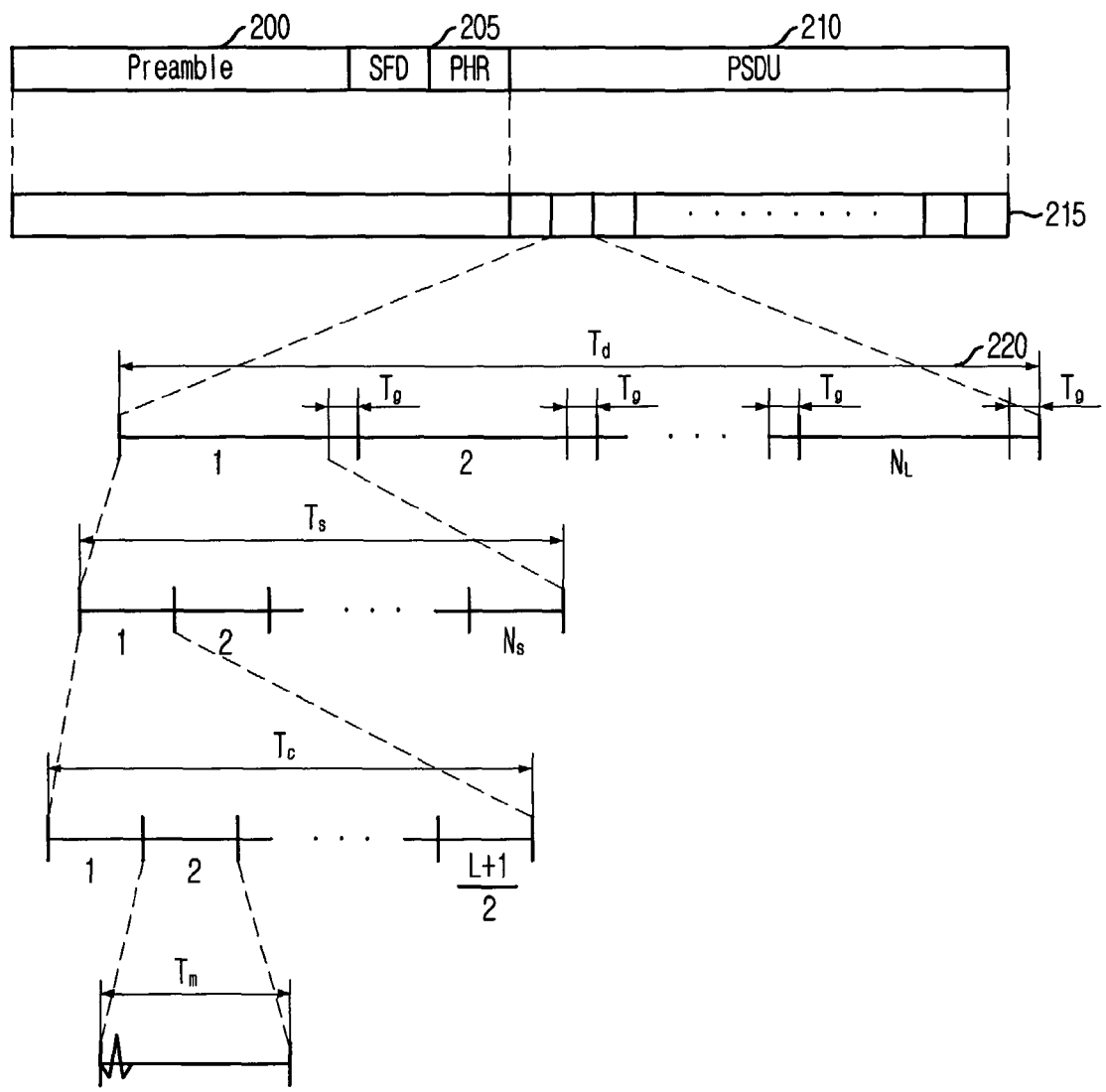
FIG. 2 is a diagram illustrating a physical layer frame which is a basic unit for communication in accordance with an embodiment of the present invention.

FIG. 2 is a diagram illustrating a physical layer frame which is a basic unit for communication in accordance with an embodiment of the present invention.

Referring to FIG. 2, the physical layer frame structure basically includes a preamble period 200 for performing synchronization in the transmitter and receiver, an SFD and PHR period 205, and a presentation service data unit (PSDU) 210 which substantially transmits data. The PSDU 210 is further divided into a plurality of data block periods 215.

As shown in FIG. 2, each data block period 215 is formed of pulses generated by using the above-described multi-coded bi-orthogonal pulse position modulation. The entire time period of a signal generated based on the multi-coded bi-orthogonal pulse position modulation is $T_s$. When a guard time period $T_g$ is added to the rear end of the signal and repetition is performed $N_L$ times, a data block period 220 occupying a time period $T_d$ is completed. Herein, when the $N_L$ value is 1, the guard time period $T_g$ is added to one data block period.

C. Structures of Transmitter and Receiver

Figure 3:
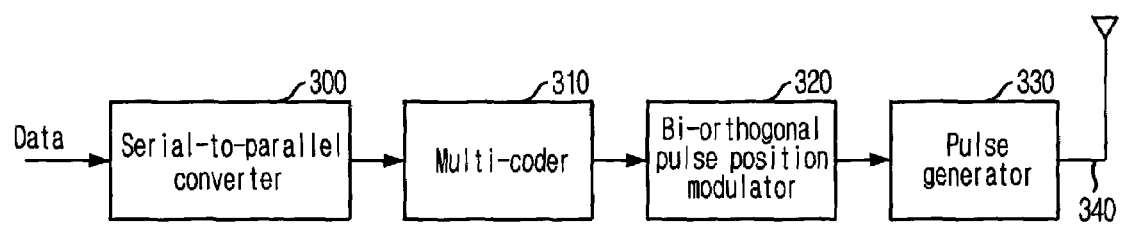
FIG. 3 is a block diagram showing a transmitter adopting multi-coded bi-orthogonal pulse position modulation in accordance with an embodiment of the present invention.

FIG. 3 is a block diagram showing a structure of a transmitter adopting multi-coded bi-orthogonal pulse position modulation in accordance with an embodiment of the present invention.

Referring to FIG. 3, the transmitter includes a serial-to-parallel converter 300 for converting L-bit serial data to be transmitted into parallel data by performing grouping thereon, a multi-coder 310 for generating the above-described multi-coded symbol, a bi-orthogonal pulse position modulator 320 for performing bi-orthogonal pulse position modulation on the generated multi-coded symbol, and a pulse generator 330 for generating a pulse to be multiplied by an output signal of the bi-orthogonal pulse position modulator 320. Output signals of the pulse generator 330 are finally transmitted through a wide band transmitting antenna 340.

Figure 4:
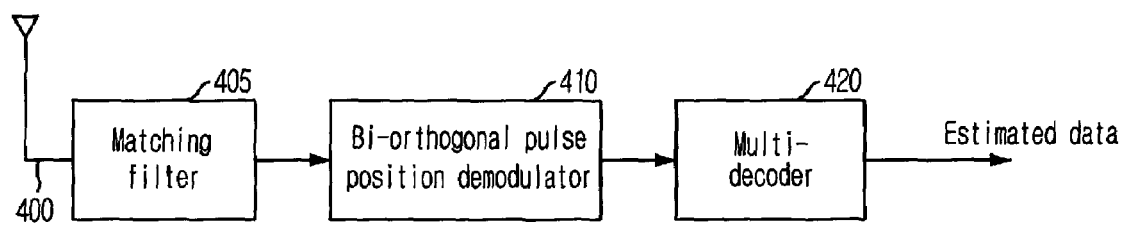
FIG. 4 is a block diagram showing a receiver adopting multi-coded bi-orthogonal pulse position demodulation in accordance with an embodiment of the present invention.

FIG. 4 is a block diagram showing a receiver adopting multi-coded bi-orthogonal pulse position demodulation in accordance with an embodiment of the present invention.

Referring to FIG. 4, the receiver includes a wide band receiving antenna 400 for receiving the multi-coded bi-orthogonal pulse position-modulated signal, a matching filter 405 for performing synchronization on the received signal, a bi-orthogonal pulse position demodulator 410 for receiving a matching-filtered signal and performing bi-orthogonal pulse position demodulation on the matching-filtered signal, and a multi-decoder 420 for receiving the bi-orthogonal pulse position-demodulated signal and performing multi-decoding thereon. The received signal goes through the multi-decoder 420 and become finally estimated data.

Figures 5, 6:
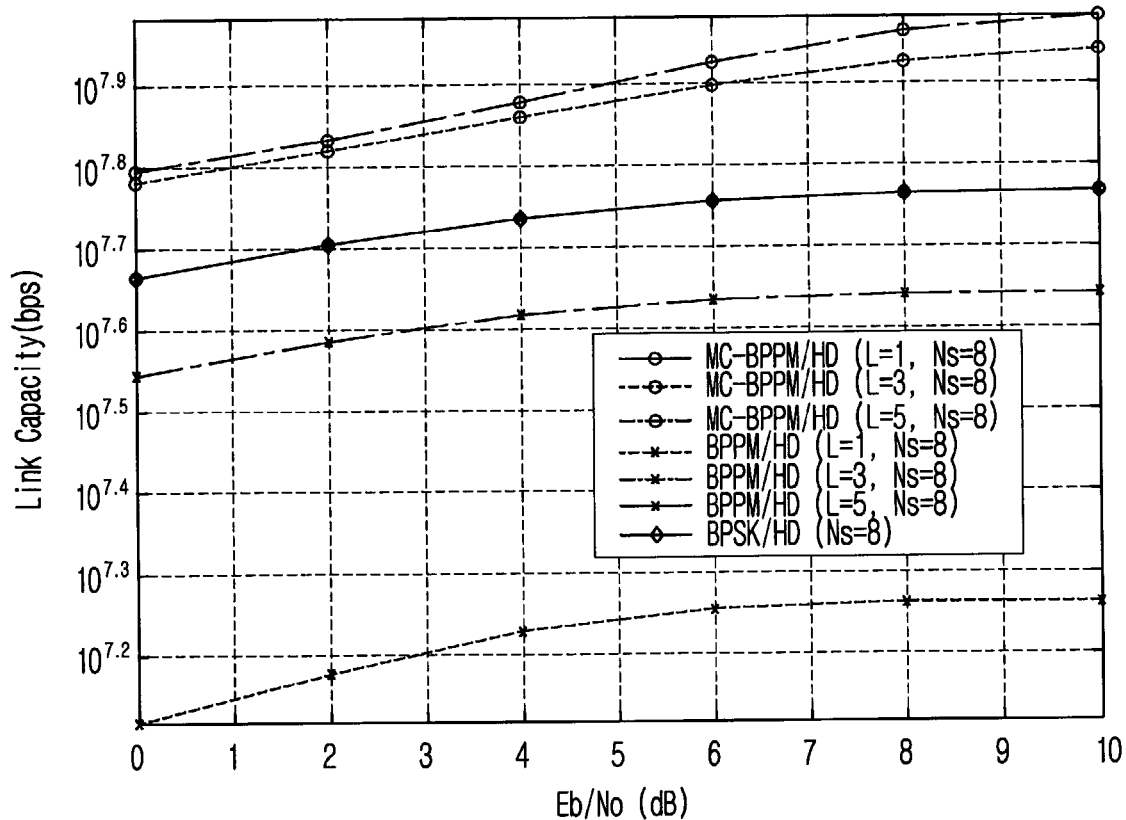
FIG. 5 is a graph comparing a link capacity of the modulation method of the present invention.
FIG. 6 is a table comparing the modulation method of the present invention with conventional modulation methods on a time period.

D. Performance Verification of Communication Method Suggested in Embodiments of the Present Invention FIG. 5 presents a result obtained by comparing the multi-coded bi-orthogonal pulse position modulation of the present invention with conventional Binary Phase Shift Keying (BPSK) and M-ary BPPM methods. As shown in FIG. 5, the multi-coded bi-orthogonal pulse position modulation method of the present invention shows more excellent link capacity than the conventional BPSK and M-ary BPPM methods.

Particularly, in the multi-coded bi-orthogonal pulse position modulation method of the present invention, the link capacity increases gradually, as the bit number of data transmitted simultaneously increases (L=1, L=3, L=5). This is different from the conventional M-ary BPPM. The high data transmission rate and the increase in the link capacity can be also understood that a time period used to transmit a pulse can be extended when the same data are transmitted during the same time period.

FIG. 6 is a table comparing a time period used to transmit a pulse in an identical environment where the transmission power per pulse and the link capacity are the same in the modulation method of the present invention with the conventional M-ary BPPM and BPSK methods. Herein, FIG. 6 shows a result of the modulation method suggested in the present invention when a period occupied by one pulse is normalized to 1 in each data rate and $(L,N_s)=(1,4)$, (3,4), (1,8), (3,8), (5,8), where L denotes the bit number L of data and $N_s$ denotes the length of an orthogonal code. It can be seen from FIG. 6 that, when the same quantity of data is transmitted for the same time period and the link capacity is the same, the maximum pulse transmission time period width of the modulation method of the present invention is longer than that of the conventional M-ary BPPM and BPSK methods. To have a look at the case where $(L,N_s)=(5,8)$ in FIG. 6, the maximum pulse transmission time period width of the M-ary BPPM method remains at 21% of that of the present invention while the BPSK method is 68.8%.

Figure 7:
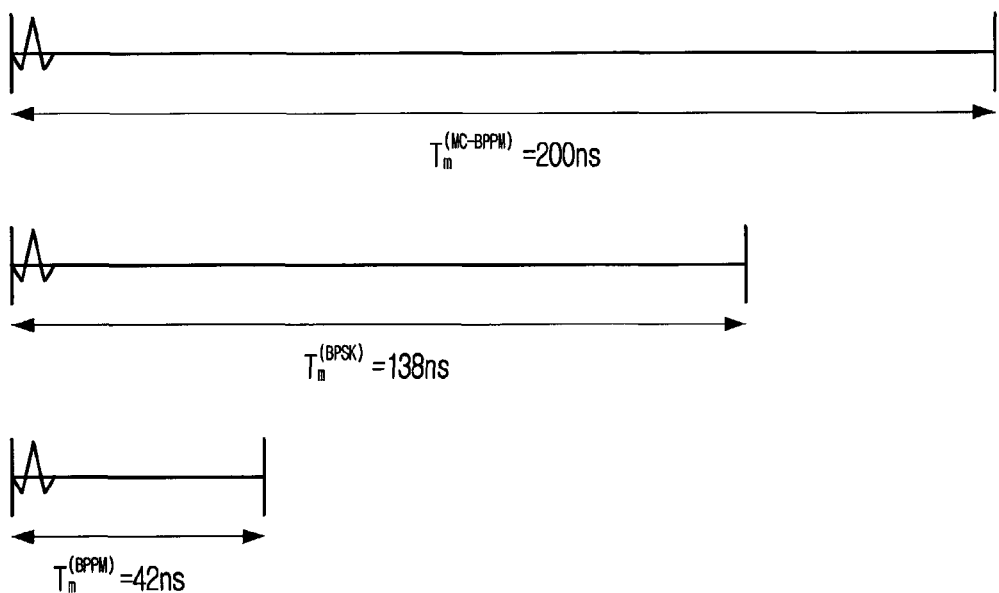
FIG. 7 is a diagram comparing the maximum pulse transmission time period widths.

FIG. 7 is a diagram comparing maximum pulse-transmission time period widths when $(L,N_s)=(5,8)$.

FIG. 7 shows the maximum pulse transmission period widths in the conventional M-ary BPPM and BPSK methods, when the maximum pulse transmission time period width is assumed to be 200 ns in the modulation method of the present invention and the link capacity is the same.

As above, the modulation method of the present invention can reduce interference caused by multipath to thereby enhance performance by extending the maximum pulse transmission period width. Also, since it does not require an additional interference removal in the receiver, it does not require additional costs for reducing complexity and realizing a circuit, and it does not increase power consumption, either.

Figure 8:
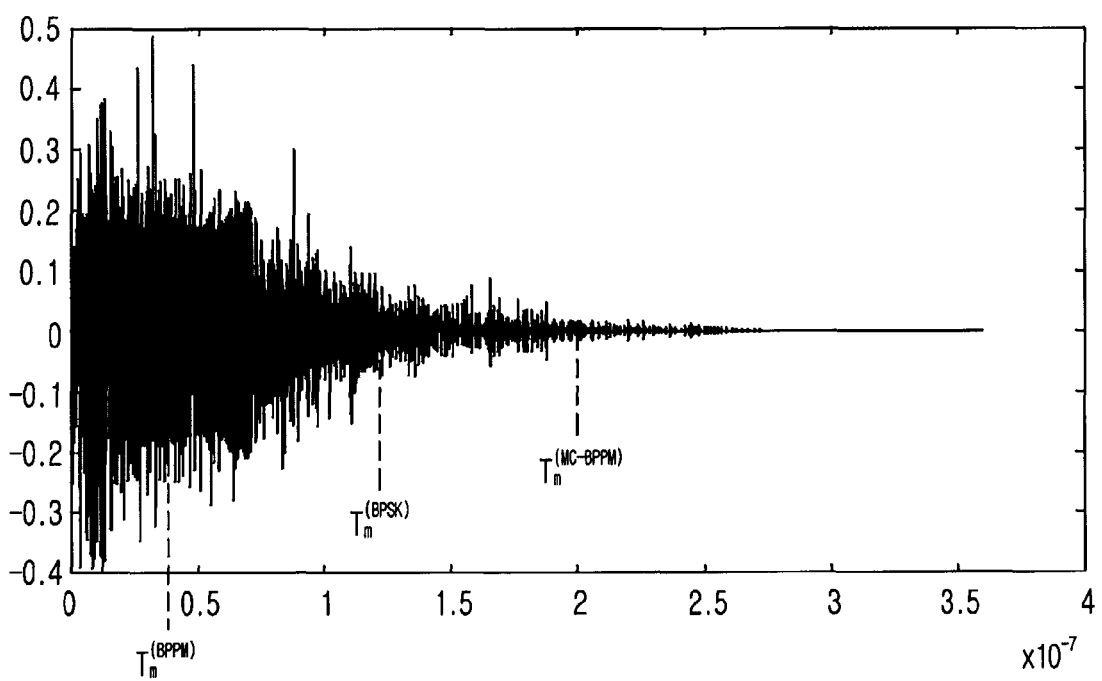
FIG. 8 is a graph comparing the amount of interference in an indoor Non-Line-of-Sight (NLOS) radio channel environment.

FIG. 8 is a graph comparing the amount of interference in an indoor Non-Line-of-Sight (NLOS) radio channel environment to show that the modulation method of the present invention can realize the aforementioned advantages.

While the present invention has been described with respect to certain preferred embodiments, it will be apparent to those skilled in the art that various changes and modifications may be made without departing from the scope of the invention as defined in the following claims.

INDUSTRIAL APPLICABILITY

Firstly, the technology of the present invention has an advantage that it can improve performance in a transmitter and a receiver by enhancing error-correction ability based on coding gain. Secondly, it can increase link capacity.

Consequently, the technology of the present invention has an advantage that it can reduce inter-pulse interference caused by multipath which occurs frequently in an indoor environment, which is a major operation environment of the wireless Personal Area Network. Also, it has an advantage that, as described with reference to FIGS. 7 and 8, it can minimize performance degradation caused by the interference between pulses in the receiver by maintaining a time period extension characteristic while it supports a variety of transmission rates.

What is claimed is:

1. A transmitter employing multi-coded bi-orthogonal pulse position modulation in an ultra wide band impulse communication apparatus, comprising:

a serial-to-parallel converter for converting a plurality of L-bit serial data to be transmitted into parallel data by performing grouping on the L-bit serial data;

a multi-coder for generating a multi-coded symbol by multiplying the parallel data by an total L orthogonal codes of length $N_s$, wherein the generated multi-coded symbol has $N_s$ elements;

a bi-orthogonal pulse position modulator for positioning the multi-coded symbol in a predetermined pulse period, and wherein the bi-orthogonal pulse modulator performs bi-orthogonal pulse position modulation on the multi-coded symbol based on the position and symmetrical characteristics of the $N_s$ elements of the multi-coded symbol in the predetermined pulse period, wherein each of the $N_s$ elements has a different value based on the plurality of L-bit serial data, wherein $(L+1)/2$ pulse position periods are required to perform the bi-orthogonal pulse position modulation on the value of the $N_s$ elements; and a pulse generator for multiplying an output signal of the bi-orthogonal pulse position modulator by a predetermined pulse and outputting an output signal.

2. The transmitter as recited in claim 1, wherein the bi-orthogonal pulse position modulator adds a predetermined guard time period to a multi-coded bi-orthogonal pulse position-modulated signal and outputs a multi-coded bi-orthogonal pulse position-modulated signal with the guard time period.

3. The transmitter as recited in claim 1, wherein the bi-orthogonal pulse position modulator performs the bi-orthogonal pulse position modulation based on the symmetrical characteristics of elements of the multi-coded symbol.

4. A receiver employing bi-orthogonal pulse position demodulation in an ultra wide band impulse communication apparatus, comprising:
- a matching filter for receiving a multi-coded bi-orthogonal pulse position modulated signal and performing matching filtering to thereby produce a matching-filtered signal, and
- wherein the received multi-coded bi-orthogonal pulse position modulated signal has $N_s$ elements;
- a bi-orthogonal pulse position demodulator for performing bi-orthogonal pulse position demodulation on the matching-filtered signal based on a predetermined demodulation method to thereby produce a bi-orthogonal pulse position demodulated signal,
- wherein the received multi-coded bi-orthogonal pulse position modulated signal is configured based on a position and symmetrical characteristics of the $N_s$ elements of the multi-coded symbol in a predetermined pulse period,
- wherein a predetermined guard time period is after each of the $N_s$ elements; and
- a multi-decoder for multi-decoding the bi-orthogonal pulse position demodulated signal based on a predetermined decoding method.

5. An ultra wide band communication apparatus, comprising:
- a transmitter for multi-coding a plurality of L-bit serial data to be transmitted based on a predetermined orthogonal code,
- wherein the multi-coded data has $N_s$ elements, and
- wherein the transmitter performs bi-orthogonal pulse position modulation on the multi-coded data based on a position and symmetrical characteristics of the $N_s$ elements of the multi-coded data having the predetermined orthogonal code, and
- wherein each of the $N_s$ elements is configured to have a different value based on the plurality of L-bit serial data; and
- a receiver for estimating a receiving signal based on decoding and demodulation methods corresponding to the coding and modulation methods used in the transmitter.

6. A modulation method of an ultra wide band impulse communication apparatus, comprising the steps of:
- a) converting L-bit serial data to be transmitted into parallel data by performing grouping on the L-bit serial data;
- b) generating a multi-coded symbol by multiplying the parallel data by total L orthogonal codes of length $N_s$ to generated $N_s$ elements; and
- c) performing bi-orthogonal pulse position modulation on the generated multi-coded symbol based on a position and symmetrical characteristics of the $N_s$ elements of the generated multi-coded symbol to thereby produce a bi-orthogonal pulse position-modulated signal,
- wherein each of the $N_s$ elements is configured to have a different value based on the plurality of L-bit serial data, and
- wherein (L+1)/2 pulse position periods are required to perform the bi-orthogonal pulse position modulation on the value of the $N_s$ elements.

7. The modulation method as recited in claim 6, further comprising the step of:
- d) adding a predetermined guard time period to the bi-orthogonal pulse position-modulated signal.

8. A method for transmitting data in an ultra wide band impulse communication apparatus based on multi-coded bi-orthogonal pulse position modulation, comprising the steps of:
- a) converting L-bit serial data to be transmitted into parallel data by performing grouping on the L-bit serial data;
- b) generating a multi-coded symbol by multiplying the parallel data by total L orthogonal codes of length $N_s$ to generated $N_s$ elements;
- c) performing bi-orthogonal pulse position modulation on the generated multi-coded symbol by positioning the multi-coded symbol based on position and symmetrical characteristics of the $N_s$ elements of the generated multi-coded symbol in a predetermined pulse period to thereby produce a bi-orthogonal pulse position-modulated signal, and
- wherein each of the $N_s$ elements is configured to have a different value based on the plurality of L-bit serial data; and
- d) multiplying the bi-orthogonal pulse position-modulated signal by a predetermined pulse.

9. An ultra wide band impulse communication method, comprising the steps of:
- a) multi-coding a predetermined data block by using a plurality of orthogonal codes, each of the plurality of orthogonal codes having a predetermined length, to thereby produce a multi-coded signal having the predetermined length;
- b) performing bi-orthogonal pulse position modulation on the multi-coded signal having the predetermined length, which is based on a predetermined method,
- wherein the produced multi-coded symbol having the predetermined length is configured based on position and symmetrical characteristics of elements of the produced multi-coded symbol to thereby produce the multi-coded signal having the predetermined length, and
- wherein after each of the predetermined lengths are generated, a guard time period is inserted; and
- c) adding a predetermined guard time period to each of pulses generated through the bi-orthogonal pulse position modulation.

10. A transmitter employing multi-coded bi-orthogonal pulse position modulation in an ultra wide band impulse communication apparatus, comprising:
- a serial-to-parallel converter for converting L-bit serial data to be transmitted into parallel data by performing grouping on the L-bit serial data;
- a multi-coder for generating a multi-coded symbol by multiplying the parallel data by an total L orthogonal codes of length $N_s$ to generate a multi-coded symbol with a code rate $L/N_s$, and
- wherein the generated multi-coded symbol has $N_s$ elements;
- a bi-orthogonal pulse position modulator for positioning the multi-coded symbol in a predetermined pulse period, and
- wherein the bi-orthogonal pulse modulator performs bi-orthogonal pulse position modulation on the multi-coded symbol based on the position and symmetrical characteristics of the $N_s$ elements of the multi-coded symbol in the predetermined pulse period,
- wherein each of the $N_s$ elements has a different value based on the plurality of L-bit serial data,
- wherein (L+1)/2 pulse position periods are required to perform the bi-orthogonal pulse position modulation on the value of the $N_s$ elements,
- wherein the bi-orthogonal pulse position modulator adds a predetermined guard time period to a multi-coded bi-orthogonal pulse position-modulated signal and outputs a multi-coded bi-orthogonal pulse position-modulated signal with the guard time period; and
- a pulse generator for multiplying an output signal of the bi-orthogonal pulse position modulator by a predetermined pulse and outputting an output signal.

* * * * *